(12) United States Patent
Mittal et al.

(10) Patent No.: US 10,023,699 B2
(45) Date of Patent: *Jul. 17, 2018

(54) CURABLE SILOXANE COMPOSITIONS

(71) Applicant: Momentive Performance Materials Inc., Waterford, NY (US)

(72) Inventors: Anuj Mittal, Bangalore (IN); Raveendra Mathad, Bangalore (IN); Sumi Dinkar, Bangalore (IN); Indumathi Ramakrishnan, Bangalore (IN); Manav Gupta, Bangalore (IN)

(73) Assignee: Momentive Performance Materials, Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,195

(22) Filed: Aug. 15, 2017

(65) Prior Publication Data

US 2018/0002492 A1  Jan. 4, 2018

Related U.S. Application Data

(62) Division of application No. 15/052,156, filed on Feb. 24, 2016, now Pat. No. 9,771,459.

(60) Provisional application No. 62/120,540, filed on Feb. 25, 2015.

(51) Int. Cl.

| | |
|---|---|
| *C08F 2/46* | (2006.01) |
| *C08G 61/04* | (2006.01) |
| *C08G 77/50* | (2006.01) |
| *C08K 5/00* | (2006.01) |
| *C09J 183/14* | (2006.01) |
| *C09D 183/14* | (2006.01) |
| *C09D 183/04* | (2006.01) |
| *C08L 83/14* | (2006.01) |
| *C08K 3/011* | (2018.01) |
| *C08K 3/013* | (2018.01) |
| *C08K 3/014* | (2018.01) |
| *C08G 77/12* | (2006.01) |
| *C08G 77/20* | (2006.01) |

(52) U.S. Cl.
CPC ............. *C08G 77/50* (2013.01); *C08K 3/011* (2018.01); *C08K 3/013* (2018.01); *C08K 3/014* (2018.01); *C08K 5/005* (2013.01); *C08K 5/0016* (2013.01); *C08K 5/0025* (2013.01); *C08K 5/0041* (2013.01); *C08L 83/14* (2013.01); *C09D 183/04* (2013.01); *C09D 183/14* (2013.01); *C09J 183/14* (2013.01); *C08G 77/12* (2013.01); *C08G 77/20* (2013.01)

(58) Field of Classification Search
CPC .. C11D 9/18; C11D 9/007; C11D 9/10; C11D 9/30; C11D 9/02; C11D 9/225; C11D 3/1213; C11D 3/3753; C11D 3/3776; C11D 3/1206; C11D 3/33; C11D 3/3757; C11D 3/48; C11D 10/042; C11D 10/04

USPC ................... 522/99, 148, 1; 520/1
See application file for complete search history.

(56) References Cited

U.S. PATENT DOCUMENTS

| | | | |
|---|---|---|---|
| 3,159,601 | A | 12/1964 | Ashby et al. |
| 3,159,662 | A | 12/1964 | Ashby et al. |
| 3,220,972 | A | 11/1965 | Lamoreaux |
| 3,445,389 | A | 5/1969 | McKellar et al. |
| 3,715,334 | A | 2/1973 | Karstedt |
| 3,775,452 | A | 11/1973 | Karstedt |
| 3,814,730 | A | 6/1974 | Karstedt |
| 5,386,007 | A | 1/1995 | Herzig |
| 9,334,372 | B1 | 5/2016 | Mittal et al. |
| 2010/0206470 | A1* | 8/2010 | Chen ............. B82Y 10/00 156/245 |

FOREIGN PATENT DOCUMENTS

| | | |
|---|---|---|
| EP | 0641819 | 9/1994 |
| JP | 2006-206884 | 8/2006 |
| WO | 9842789 | 10/1998 |

OTHER PUBLICATIONS

J.L. Spier, Homogeneous Catalysis of Hydrosilation by Transition Metals, Advances in Organometallic Chemistry, vol. 17, pp. 407-447.
Written Opinion and Search Report from PCT/US2016/019287 dated Jul. 6, 2016.
Hori, JP 2006-206884 Machine Translation, Aug. 10, 2006.
Putzien et al., UV Curing of Epoxy Functional Hybrid Silicones, Apr. 27, 2012, Journal of Applied Polymer Science. vol. 126, 1188-1197.

* cited by examiner

*Primary Examiner* — Jessica Whiteley
(74) *Attorney, Agent, or Firm* — James C. Abruzzo

(57) ABSTRACT

There is provided herein a curable polysiloxane composition comprising a reactive polysiloxane having the general structural formula (I):

(I)

$$M-[R^4]_m-\underset{\underset{R^1}{|}}{\overset{\overset{R^1}{|}}{Si}}-O-\left[\underset{\underset{R^2}{|}}{\overset{\overset{R^2}{|}}{Si}}-O\right]_x-\left[\underset{\underset{R^3}{|}}{\overset{\overset{R^3}{|}}{Si}}-O\right]_y-\underset{\underset{R^1}{|}}{\overset{\overset{R^1}{|}}{Si}}-Z-\underset{\underset{R^1}{|}}{\overset{\overset{R^1}{|}}{Si}}-O-$$

$$-\left[\underset{\underset{R^2}{|}}{\overset{\overset{R^2}{|}}{Si}}-O\right]_x-\left[\underset{\underset{R^3}{|}}{\overset{\overset{R^3}{|}}{Si}}-O\right]_y-\underset{\underset{R^1}{|}}{\overset{\overset{R^1}{|}}{Si}}-[R^4]_m-M\Bigg]_{n'}$$

as described herein. There is provided a method of making the polysiloxane. In addition, there is provided a curable composition including the polysiloxane.

21 Claims, No Drawings

CURABLE SILOXANE COMPOSITIONS

CROSS-REFERENCE TO RELATED APPLICATIONS

The present application is a continuation application of U.S. patent application Ser. No. 15/052,156 filed Feb. 24, 2016, which claims priority to Provisional U.S. Patent Application No. 62/120,540 filed Feb. 25, 2015, the entire contents of both earlier applications are incorporated by reference herein.

FIELD OF THE INVENTION

The invention is directed to polysiloxanes, more specifically, reactive polysiloxanes and their use in curable compositions and applications containing the same.

BACKGROUND OF THE INVENTION

Polysiloxanes are well-known materials which have long been used as a reactive component to react or crosslink or cure with other materials in order to form a cured composition containing polysiloxane components. Cured compositions containing polysiloxane components are used in a variety of applications. However, when these polysiloxane components are used, they often experience poor compatibility with the other components, resulting in poor clarity (haze), which is especially detrimental when clear compositions are desirable.

While reactive polysiloxanes have been prepared, many contain polysiloxane chains of dimethylsiloxy repeat units which make the polysiloxane incompatible with other organic polymers or other components in the composition. The polysiloxanes often result in poor paintability, due to the chains of dimethylsiloxy repeat units. Reactive polysiloxanes have been prepared with pended groups to improve the compatibility with other components, such as pendent poly (alkylene oxide) groups. However, these pendent groups often change the partial molar volume of the reactive polysiloxane, resulting in a loss of physical properties, such as comparative tracking index, tensile, modulus and/or low temperature impact resistance. Therefore, there is a need for a reactive polysiloxane that improves the capability of the reactive polysiloxanes with other components of the composition, as determined for example by haze, without loss of the other physical properties.

SUMMARY OF THE INVENTION

In one non-limiting embodiment herein there is provided a polysiloxane having the general structural formula (I):

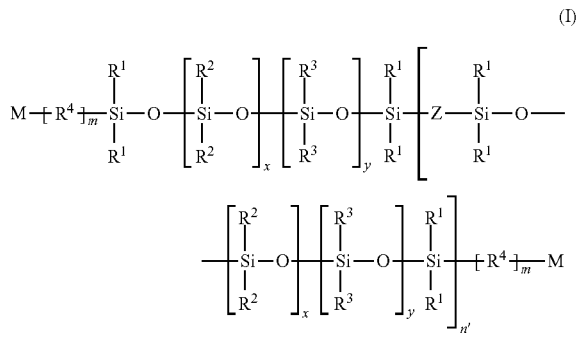

(I)

wherein each of $R^1$, $R^2$ and $R^3$ is independently a linear or branched aliphatic group containing up to about 20 carbon atoms, e.g., from 1 to about 20 carbon atoms, more specifically from 2 to about 16 carbon atoms, an unsubstituted or substituted aryl group containing from 6 to about 18 carbon atoms, optionally containing at least one heteroatom, and an alicyclic group containing up to about 20 carbon atoms; each $R^4$ is independently a divalent alkyl group of from 1 to about 6 carbon atoms, an unsubstituted or substituted aryl group containing up to about 18 carbon atoms, an unsubstituted or substituted alicyclic group containing up to about 18 carbon atoms, an unsubstituted or substituted acyl group containing up to about 18 carbon atoms, an ester group containing up to about 8 carbon atoms, an ether group containing up to about 8 carbon atoms, or an acyl group containing up to about 8 carbon atoms; each Z is independently selected from a divalent linear, branched or cyclic alkyl group containing from 2 to 25 carbon atoms, a divalent linear, branched or cyclic alkenyl group containing from 2 to 25 carbon atoms, and a divalent unsubstituted or substituted aryl group of up to about 20 carbon atoms; each M is independently hydrogen, a hydroxy group, an alkenyl group of from 2 to about 12 carbon atoms, an alkynyl group of from 2 to about 12 carbon atoms, an amino group, an alkoxy group containing from 1 to about 8 carbon atoms, an alkoxyalkyl group containing from 2 to about 10 carbon atoms, an oximoalkyl group containing up to about 8 carbon atoms, wherein the lower endpoint can be 1, 2 or 3, an enoxyalkyl group containing up to about 8 carbon atoms, wherein the lower endpoint can be 1, or 2, an aminoalkyl group containing up to about 8 carbon atoms, wherein the lower endpoint can be 1 or 2, a carboxyalkyl group containing up to about 8 carbon atoms wherein the lower endpoint can be 1 or 2, an amidoaliphatic group containing up to about 8 carbon atoms wherein the lower endpoint can be 1 or 2, an amidoaryl group containing up to about 12 carbon atoms wherein the lower endpoint can be 6 or 7, a carbamato alkyl group containing up to about 8 carbon atoms wherein the lower endpoint can be 2 or 3, an epoxy group containing at least 2 and up to 8 carbon atoms, an anhydride group containing at least 3 or 4 carbon atoms and up to 12 carbon atoms, a carboxyl group containing from 1 up to about 8 carbon atoms, a carbonyl group, an acyl group containing from 1 up to about 8 carbon atoms, an amide group, an ionic group, an imine group containing from 1 or 2 up to about 8 carbon atoms, an isocyanate group, a nitrile group, an (meth)acryl group, an (meth)acrylol group, an alkoxysilyl group containing from 1 to about 8 carbon atoms, an alkoxyalkylsilyl group containing from 2 to about 8 carbon atoms, an acyloxysilyl group containing from 1 to about 8 carbon atoms, a hydroxyalkylsilyl group containing from 1 to about 8 carbon atoms or a thiol group; and the subscript x is an integer of from 1 to 250, the subscript y is from 0 to 100, the subscript n' is an integer greater than 1, and the subscript m is an integer of from to 1 to 5.

In yet another embodiment herein there is provided a curable composition comprising (a) a polysiloxane of the general formula (I) as described above, where M is an alkenyl or alkynyl group, and (b) a polysiloxane of the general formula (II):

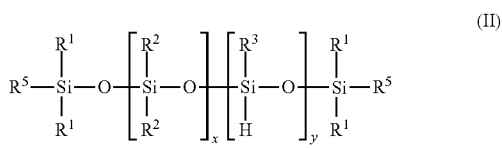

(II)

wherein each of $R^1$, $R^2$, $R^3$, x and y is as defined above, $R^5$ is hydrogen, an alkyl group of from 1 to 4 carbon atoms or phenyl, with the proviso that when y is 0 or 1, $R^5$ is hydrogen.

In yet even another embodiment herein there is provided a curable composition comprising (a) a polysiloxane of the general formula (I) wherein each of $R^1$, $R^2$, $R^3$, $R^4$, Z, x, y, and m is as defined above, and each M is independently selected from an alkenyl group, an alkynyl group, an amino group, an alkoxy group, an alkoxyalkyl, an oximoalkyl, an enoxyalkyl, an aminoalkyl, a carboxyalkyl, an amidoalkyl, an amidoaryl, a carbamatoalkyl, an epoxy group, an anhydride group, a carboxyl group, a carbonyl group, an acyl group, an amide group, an ionic group, an amide group, an imine group, an isocyanate, nitrile, an acryl group, an acrylol group or a thiol group, wherein these groups have the ranges of carbon atoms defined elsewhere herein, and n' is greater than 1, and (b) an initiator for photo-curing and optionally (c) a further reactive component selected from the group consisting of a photo curable reactive component, a crosslinker of silane type, a filler, adhesion promoter, solvent, cure promoter, a cure retardant and combinations thereof.

DETAILED DESCRIPTION OF THE INVENTION

The present invention relates to reactive polysiloxane compounds. Such polysiloxane compounds can be used to make copolymers therefrom, e.g., polycarbonate-polysiloxane copolymers, or curable compositions with improved physical and chemical properties. The polysiloxane compounds and copolymers herein have been found to have a higher degree of polymerization which provides for improved physical properties in the resultant polymer composition. Some non-limiting examples of such improvements can be any one or more of thermal stability, high heat distortion temperature, comparative tracking index, flame resistance, refractive index, low temperature impact, flexibility without compromising transparency, low-melt viscosity, oxygen barrier property, UV resistance and adhesion, e.g., improved paintability.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

It will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In one embodiment herein in general formula (I) as described above (and as used elsewhere herein) each of $R^1$, $R^2$ and $R^3$ are independently a linear or branched aliphatic group containing up to about 20 carbon atoms, more specifically up to about 12 carbon atoms, more specifically up to about 8 carbon atoms, wherein in one more specific embodiment the lower endpoint of such ranges can be any one of 1, 2, 3, 4 or 5, in some embodiments the branched aliphatic group can be an unsaturated group of the aforestated carbon atom lengths, or a branched hydrocarbon radical of the aforestated carbon atom lengths; an unsubstituted or substituted aryl group containing from 6 to about 18 carbon atoms, more specifically from about 6 to about 12 carbon atoms, and most specifically from 6 to about 10 carbon atoms, optionally containing at least one heteroatom, e.g., O, N or S, and in some embodiments the aryl group can be a bridged cyclic aryl group of the aforestated carbon atom lengths; and an alicyclic group containing up to about 20 carbon atoms more specifically up to about 12 carbon atoms, more specifically up to about 8 carbon atoms, wherein in one more specific embodiment the lower endpoint of such ranges can be any one of 1, 2, 3, 4 or 5.

In a further embodiment, general formula (I) as described above (and as used elsewhere herein) can be defined such that each $R^4$ is independently, a divalent alkyl group of from 1 to about 6 carbon atoms, more specifically from 1 to about 4 carbon atoms and most specifically methyl or ethyl, and in one non-limiting embodiment from 2 to about 6 carbon atoms; an unsubstituted or substituted aryl group containing up to about 18 carbon atoms, more specifically up to about 12 carbon atoms, and most specifically up to about 10 carbon atoms, wherein the lower endpoint of such ranges can be any one of 6, 7, 8, 9 or 10; an ester group containing up to about 8 carbon atoms, more specifically up to about 6 carbon atoms and most specifically up to about 3 carbon atoms, wherein the lower endpoint of such ranges can be any one of 2 or 3; an ether group containing up to about 8 carbon atoms, more specifically up to about 6 carbon atoms and most specifically up to about 3 carbon atoms, wherein the lower endpoint of such ranges can be any one of 2 or 3; or an acyl group containing up to about 8 carbon atoms, more specifically up to about 6 carbon atoms and most specifically up to about 3 carbon atoms, wherein the lower endpoint of such ranges can be any one of 1 or 2.

In another embodiment, general formula (I) as described above (and as used elsewhere herein) can be defined such that each Z is independently a divalent linear, branched or cyclic alkyl group containing up to 25 carbon atoms, more specifically up to about 20 carbon atoms, even more specifically up to about 16 carbon atoms, and yet even more specifically up to about 12 carbon atoms, and most specifically up to about 10 carbon atoms, e.g., 8 carbon atoms, wherein in one embodiment such ranges can have a lower endpoint of any one of 1, 2, 3, 4 or 5; a divalent linear, branched or cyclic alkenyl group containing up to 25 carbon atoms, more specifically up to about 20 carbon atoms, even more specifically up to about 16 carbon atoms, and yet even more specifically up to about 12 carbon atoms, and most specifically up to about 10 carbon atoms, e.g., 8 carbon atoms, wherein in one embodiment such ranges can have a lower endpoint of any one of 2, 3, 4 or 5, or a divalent unsubstituted or substituted aryl group of up to about 20 carbon atoms, more specifically up to about 18 carbon atoms and most specifically up to about 12 carbon atoms, wherein the lower endpoint of such ranges can in some non-limiting embodiments be any one of 6, 7, 8, 9 or 10.

In another embodiment in general formula (I) as described above (and as used elsewhere herein) the subscript x is an integer of from 1 to 250, more specifically from about 1 to about 100, even more specifically from 1 to about 50, yet even more specifically from 1 to about 25, more specifically from 1 to about 15 and most specifically from 1 to about 10. In one embodiment, the aforementioned ranges for the subscript "x" can have lower endpoints of any one of 2, 3, 4, or 5. In another embodiment in general formula (I) as described above (and as used elsewhere herein) the subscript y is an integer of from 0 to 40, more specifically from 1 to about 30, even more specifically from 1 to about 20, yet even more specifically from 1 to about 10 and most specifically from 1 to about 8, wherein said ranges can in one embodiment, have a lower endpoint of any one of 2, 3, 4 or 5. In another embodiment the subscript m is from 1 to 5, more specifically from 1 to any one of 2, 3 or 4.

In one embodiment herein the polysiloxane of general formula (I) as described above, has a degree of polymerization as defined by the subscript n' to be greater than 1, more specifically≥2, and most specifically≥1.2 which is introduced between the siloxane blocks. It will be understood that these ranges of polymerization can in one non-limiting embodiment have upper endpoints of any one of 4, 5, 8, 10, 12, 15, 20, 35, 50, 75, 100, 250, 500, 1000, 2500, 5000 and 10,000. This degree of polymerization which can provide flexibility in selecting physical properties of a copolymer including the same.

In one non-limiting embodiment, each of $R^1$ and $R^2$ can be an alkyl of from 1 to 6 carbon atoms, more specifically 1 to 4 carbon atoms, such as the non-limiting examples of methyl and ethyl, more specifically methyl. In one embodiment each $R^1$ and $R^2$ are methyl. Further in some embodiments, each $R^3$ group can be an aryl group of from 6 to 8 carbon atoms, such as the non-limiting example of phenyl. In one embodiment, each $R^3$ group is phenyl. Further, in a more specific embodiment herein, the subscript x can be from 15 to 30, more specifically from 18 to 26, and in some even more specific embodiments x can be from 19 to 25, such as the non-limiting examples of 20, 22 and 24. In some embodiments, y can either be 0 or 4. In a more specific embodiment herein the definition of Z can be a divalent alkylene group of from 6 to 10 carbon atoms, more specifically from 7 to 9 carbon atoms, such as the non-limiting example of wherein Z is a divalent octylene group.

It will be understood herein that in one non-limiting embodiment, any definition of any one or more of $R^1$, $R^2$, $R^3$, $R^4$, Z, M, x, y, n' and m can also have the same definition in any formulae that appear herein that contain such variables or subscripts.

As used herein the terminology "hydrocarbon radical" includes acyclic hydrocarbon radicals, alicyclic hydrocarbon radicals and aromatic hydrocarbon radicals.

As used herein in reference to a hydrocarbon radical, the term "monovalent" means that the radical is capable of forming one covalent bond per radical, the term "divalent" means that the radical is capable of forming two covalent bonds per radical and the term "trivalent" means that the radical is capable of forming three covalent bonds per radical. Generally, a monovalent radical can be represented as having been derived from a saturated hydrocarbon compound by conceptual removal of one hydrogen atom from the compound, a divalent radical can be represented as having been derived from a saturated hydrocarbon compound by conceptual removal of two hydrogen atoms from the compound and a trivalent radical can be represented as having been derived from a saturated hydrocarbon compound by conceptual removal of three hydrogen atoms from the compound. For example, an ethyl radical, that is, a —$CH_2CH_3$ radical, is a monovalent radical; a dimethylene radical, that is, a —$(CH_2)_2$— radical, is a divalent radical and an ethanetriyl radical, that is, (—)$_2CHCH_2$— radical, is a trivalent radical, each of which can be represented as having been derived by conceptual removal of one or more hydrogen atoms from the saturated hydrocarbon ethane.

As used herein, the terminology "acyclic hydrocarbon radical" means a straight chain or branched hydrocarbon radical, preferably containing from 1 to 60 carbon atoms per radical, which may be saturated or unsaturated and which may be optionally substituted or interrupted with one or more atoms or functional groups, such as, for example, carboxyl, cyano, hydroxy, halo and oxy. Suitable monovalent acyclic hydrocarbon radicals may include, for example, alkyl, alkenyl, alkynyl, hydroxyalkyl, cyanoalkyl, carboxyalkyl, alkyloxy, oxaalkyl, alkylcarbonyloxaalkylene, carboxamide and haloalkyl, such as, for example, methyl, ethyl, sec-butyl, tert-butyl, octyl, decyl, dodecyl, cetyl, stearyl, ethenyl, propenyl, butynyl, hydroxypropyl, cyanoethyl, butoxy, 2,5,8-trioxadecanyl, carboxymethyl, chloromethyl and 3,3,3-fluoropropyl.

Suitable divalent acyclic hydrocarbon radicals include, for example, linear or branched alkylene radicals, such as, for example, methylene, dimethylene, trimethylene, decamethylene, ethylethylene, 2-methyltrimethylene, 2,2-dimethyltrimethylene and linear or branched oxalkylene radicals such as, for example, methyleneoxypropylene.

Suitable trivalent acyclic hydrocarbon radicals include, for example, alkanetriyl radicals, such as, for example, 1,1,2-ethanetriyl, 1,2,4-butanetriyl, 1,2,8-octanetriyl, 1,2,4-cyclohexanetriyl and oxaalkanetriyl radicals such as, for example, 1,2,6-triyl-4-oxahexane.

As used herein the term "alkyl" means a saturated straight or branched monovalent hydrocarbon radical. In a preferred embodiment, monovalent alkyl groups are selected from linear or branched alkyl groups containing from 1 to 60 carbons per group, such as, for example, methyl, ethyl, propyl, iso-propyl, n-butyl, iso-butyl, sec-butyl, tert-butyl, pentyl, hexyl, heptyl, decyl, dodecyl.

As used herein the term "alkenyl" means a straight or branched monovalent terminally unsaturated hydrocarbon radical, preferably containing from 2 to 10 carbon atoms per radical, such as, for example, ethenyl, 2-propenyl, 3-butenyl, 5-hexenyl, 7-octenyl and ethenylphenyl.

As used herein, the terminology "alicyclic hydrocarbon radical" means a radical containing one or more saturated hydrocarbon rings, specifically containing from 4 to 12 carbon atoms per ring, per radical which may optionally be substituted on one or more of the rings with one or more alkyl radicals, each preferably containing from 2 to 6 carbon atoms per alkyl radical, halo radicals or other functional groups and which, in the case of a monovalent alicyclic hydrocarbon radical containing two or more rings, may be fused rings. Suitable monovalent alicyclic hydrocarbon radicals include, for example, cyclohexyl and cyclooctyl. Suitable divalent hydrocarbon radicals include, saturated or unsaturated divalent monocyclic hydrocarbon radicals, such as, for example, 1,4-cyclohexylene. Suitable trivalent alicyclic hydrocarbon radicals include, for example, cycloalkanetriyl radicals such as, for example, 1-dimethylene-2,4-cyclohexylene, 1-methylethylene-3-methyl-3,4-cyclohexylene.

As used herein, the terminology "aromatic hydrocarbon radical" means a hydrocarbon radical containing one or more aromatic rings per radical, which may, optionally, be substituted on the aromatic rings with one or more alkyl radicals, each preferably containing from 2 to 6 carbon atoms per alkyl radical, halo radicals or other functional groups and which, in the case of a monovalent aromatic hydrocarbon radical containing two or more rings, may be fused rings. Suitable monovalent aromatic hydrocarbon radicals include, for example, phenyl, tolyl, 2,4,6-trimethylphenyl, 1,2-isopropylmethylphenyl, 1-pentalenyl, naphthyl, anthryl, eugenol and allylphenol as well as aralkyl radicals such as, for example, 2-phenylethyl. Suitable divalent aromatic hydrocarbon radicals include, for example, divalent monocyclic arenes such as, for example, 1,2-phenylene, 1,4-phenylene, 4-methyl-1,2-phenylene, phenylmethylene. Suitable trivalent aromatic hydrocarbon radicals include, for example, trivalent monocyclic arenes such as, for example, 1-trimethylene-3,5-phenylene.

In an embodiment, the present invention relates to a curable polysiloxane composition. The curable polysiloxane composition provides elastomers, sealants, adhesives and coatings for desired properties and applications.

In one non-limiting embodiment herein the polysiloxane compound of the general formula (I) as described herein can be made by step-growth polymerization. For example, there is provided in one embodiment a method which comprises hydrosilylating a hydride-terminated polysiloxane, such as a hydride-terminated polysiloxane represented by the general structural formula (III):

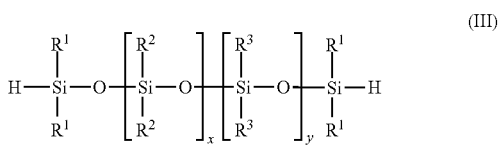

wherein each $R^1$, $R^2$ and $R^3$, x and y are as defined herein, with a diene or an alkyne. The diene in one embodiment can comprise a diene which contains a linear, branched or cyclic alkyl group containing from 2 to 25 carbon atoms, or more specifically any of the ranges of carbon atoms provided herein for the divalent alkyl group of the variable Z. Alternatively, the diene can contain a linear, branched or cyclic alkenyl group of from 2 to 25 carbon atoms, or more specifically any of the ranges of carbon atoms provided herein for the divalent alkenyl group of the variable Z.

This hydrosilylating of formula (III) with diene can be done under conventional hydrosilylation conditions, such as with the use of a precious metal catalyst, e.g., a platinum catalyst, and in some non-limiting embodiments can be conducted at a temperature of from 80° C. to about 110° C. and for a period of from about 5 to about 8 hours.

Many types of precious metal catalysts, e.g., platinum catalysts, are known and such platinum catalysts may be used for the hydrosilylation reaction in the present invention. When optical clarity is required the preferred platinum catalysts are those platinum compound catalysts that are soluble in the reaction mixture. The platinum compound can be selected from those having the formula ($PtCl_2$Olefin) and H($PtCl_3$Olefin) as described in U.S. Pat. No. 3,159,601, which is hereby incorporated by reference in its entirety. A further platinum containing material usable in the compositions of the present invention is the cyclopropane complex of platinum chloride described in U.S. Pat. No. 3,159,662 hereby incorporated by reference in its entirety. Further the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972 hereby incorporated by reference in its entirety. The catalysts most specifically used herein are described in U.S. Pat. Nos. 3,715,334; 3,775,452; and 3,814,730 to Karstedt the contents of which are incorporated by reference herein in their entireties. Additional background concerning the art may be found at J. L. Spier, "Homogeneous Catalysis of Hydrosilation by Transition Metals, in Advances in Organometallic Chemistry, volume 17, pages 407 through 447, F. G. A. Stone and R. West editors, published by the Academic Press (New York, 1979), the contents of which is incorporated by reference in its entirety.

In one embodiment the precious metal catalysts that may be used herein, are such as the non-limiting examples of rhodium, ruthenium, palladium, osmium, iridium and platinum catalysts and combinations thereof.

In one embodiment herein the platinum catalyst is in a soluble complex form.

In one other embodiment, the platinum catalyst is selected from the group consisting of platinic chloride, chloroplatinic acid, bis(acetylacetonato)platinum, ($\eta^5$-cyclopentadienyl) trialkylplatinum and combinations thereof.

Persons skilled in the art can easily determine an effective amount of precious metal catalyst. The catalyst can be present in a very wide range, but normally a range of from about 0.1 to about 10,000 ppm, more specifically of from about 1 to about 100 ppm.

The method of hydrosilylating of formula (III) with diene can provide a hydride-terminated polysiloxane represented by the structural formula (IV):

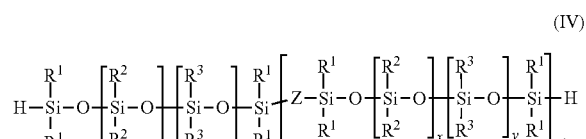

(IV)

wherein each of $R^1$, $R^2$, $R^3$, Z, x, y and n' are as defined.

In one embodiment, the method can then further comprise hydrosilylation of the hydride-terminated polysiloxane of formula (IV) with an unsaturated compound of the general formula (V):

(V)

where $R^{4*}$ is selected from an alkenyl group containing from 2 to 6 carbon atoms, more specifically 2 to 4 carbon atoms, such as an allyl group or a vinyl group, allyl acyl group containing up to 15 carbon atoms, a vinyl acyl group containing up to 15 carbon atoms, allyl carbonyloxy group of up to 15 carbon atoms, allyl phenyl group of up to about 18 carbon atoms, vinyl phenyl group of from 8 to about 18 carbon atoms, allyl ether group of up to 8 carbon atoms, vinyl ether group of up to 8 carbon atoms, wherein one or more of such $R^{4*}$ groups can optionally contain one or more of a hydroxyl group, an alkoxy group of from 1 to 4 carbon atoms, a hetero atom such as O, N or S; M is as defined above for formula (I), and the subscript m is an integer of from 1 to 5 and as described herein, and when the subscript m=1, then the aforementioned groups of $R^{4*}$ are terminal groups, and when the subscript m is >1 then the aforementioned groups of $R^{4*}$ comprise at least one divalent group and one terminal group, to obtain the polysiloxane compound of formula (I). Some non-limiting examples of the compound of the general formula (V) include eugenol, allyl acetate, allyl acetoacetate, allyl alcohol, allyl alcohol propoxylate, allyl amine, allyl amine hydrochloride, allyl benzyl ether, allyl butyl ether, allyl butyrate, allyl cyanide, allyl chloroacetate, allyl cyclohexane propionate, allyl methyl carbamate, allyl methyl carbonate, allyl methylsulfone, 2-allyloxybenzaldehyde, allyloxyethanol, 4-allyloxy-2-hydroxybenzophenone, 3-allyloxy-2-hydroxy-1-propane-sulfonic acid sodium salt, 3-allyloxy-1,2-propanediol, allyl phenyl ether, allylphosphonic acid, allyl sulfonic acid, allylphosphonic acid salt, allyl sulfonic acid salt, allyl propyl ether, allyl trifluoroacetate, tert-butyl N-allyl carbamate, trimethylolpropane allyl ether, vinyl acetate, vinyl benzoate, vinyl alcohol, vinyl amine, vinyl acetoacetate, vinyl 4-tert-butylbenzoate, vinyl chloroformate, vinyl chloroformate, vinyl cinnamate, vinyl decanoate, vinyl neodecanoate, vinyl neononanoate, vinyl pivalate, vinyl propionate, vinyl stearate, vinyl trifluoroacetate, vinyl valerate, p-vinyl phenol, o-vinyl phenol, p-allyl phenol, o-allyl phenol, vinyl cyanate, vinyl thiocyanate, styrene, α-methylstyrene, allylphenol, vinylphenylamine, allylphenylamine, monomers of vinylnitro, vinyl acetic, vinylcarboxy, vinylbenzoate, vinylphenylsulfides, allyl(meth)acrylate, isocyanates, thiocyanates and mixtures thereof. Such hydrosilylation can occur at the same conditions as described above.

In one non-limiting embodiment, instead of hydrosilylation, the polysiloxane of the general formula (I) can also be prepared by any one or more of anionic polymerization, free-radical polymerization, ring-opening metathesis polymerization (ROMP), acyclic diene metathesis (ADMET), and coordination polymerization, which polysiloxane of the general formula (I) can also use as structural unit in the copolymer described herein.

In one non-limiting embodiment herein there is provided a method for the preparation of the reactive polysiloxane of formula (I) which is depicted by the reaction scheme:

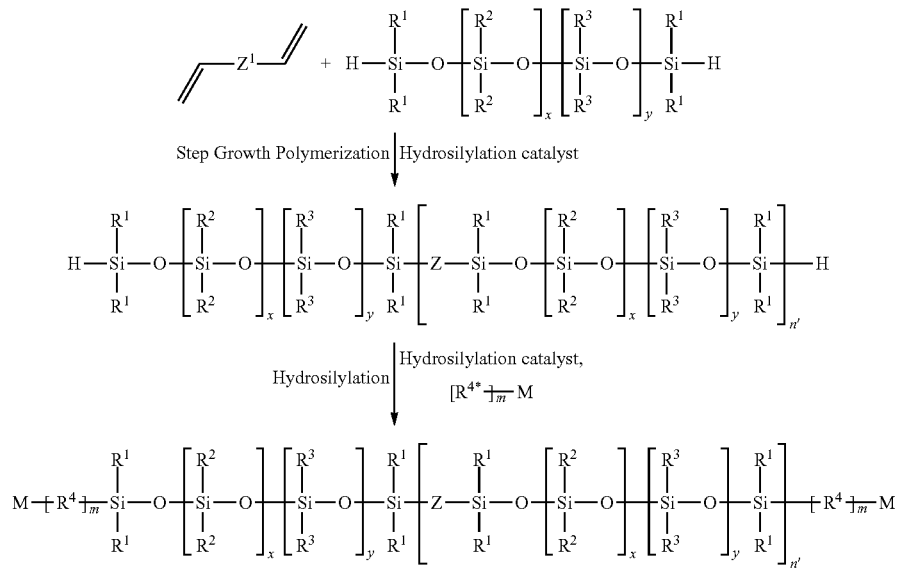

wherein $R^1$, $R^2$, $R^3$, $R^4$, $R^{4*}$, M, Z, m, n', x and y are defined above and $Z^1$ is a chemical bond or a divalent linear, branched or cyclic alkyl groups containing up to 16 carbon atoms.

The hydrosilylation steps in the above reaction scheme can be conducted under the conditions described above.

In one embodiment herein in the method described for making the polysiloxane (I) after the hydrosilylation of the compound of formula (IV) with the compound of formula (V), the method can further comprise purifying the siloxane of the formula (I) from the reaction product mixture. Any conventional method of purification can be used, such as filtration, extraction, distillation and the like. Some more specific methods of purifying the reaction product mixture can comprise thin film evaporation, pre-evaporation, a vapor-liquid separation, a packed bed column distillation, a rotary thin film evaporation and an evaporator-stripper purification.

The polysiloxane compounds of general formula (I) have improved properties over that of conventional polysiloxane compounds that are used in polymer compositions, e.g., polycarbonate compositions, such as polysiloxanes which do not have one or more polymerized alkyl, alkenyl or aryl spacers in the molecule. In one non-limiting embodiment the polysiloxane of general formula (I) can have an improvement over such other siloxanes in an improvement in at least one of refractive index, temperature of decomposition, high molecular weight, lower polydispersity, unimodal distribution and glass transition temperature.

In one embodiment, the polysiloxane of general formula (I) can have one or more of a refractive index of from 1.40 to about 2.25, more specifically from about 1.42 to about 1.98; a temperature of decomposition of from about 350 to about 520° C. and more specifically from about 375 to about 500° C.; a high molecular weight of from about 3.5 to about 12 kDa more specifically from about 4.0 to about 10.0 kDa, said molecular weights being weight average molecular weight; lower polydispersity of from about 1.10 to about 3.0, more specifically from about 1.20 to about 2.5, and a glass transition temperature of from about −60 to about −130. In one embodiment, the weight average molecular weight is determined in accordance with ASTM D5296-11, Standard Test Method for Molecular Weight Averages and Molecular Weight Distribution of Polystyrene by high Performance Size-Exclusion Chromatography.

In one embodiment herein there is provided a curable composition comprising at least one polysiloxane of the general formula (I) as described herein. In one further embodiment, such a curable composition comprising at least one polysiloxane of the general formula (I) can further comprise a polysiloxane of the general formula (II) as described herein, and/or a crosslinker or chain extender. In one embodiment, the crosslinker or chain extender is a silane or siloxane crosslinker or chain extender. In one more specific embodiment, the silane or siloxane crosslinker or chain extender is selected from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, and combinations of two or more thereof.

According to one embodiment, the crosslinker component is chosen from tetraethylorthosilicate (TEOS); methyltrimethoxysilane (MTMS); vinyltrimethoxysilane; methylvinyldimethoxysilane; dimethyldimethoxysilane; dimethyldiethoxysilane; vinyltriethoxysilane; tetra(n-propyl) orthosilicate; tris(methylethylketoximo)vinylsilane; tris (methylethylketoximo)methylsilane; tris(acetamido) methylsilane; bis(acetamido)dimethylsilane; tris(N-methylacetamido)methylsilane; bis(N-methylacetamido) dimethylsilane; (N-methylacetamido)methyldialkoxysilane; tris(benzamido)methylsilane; tris(propenoxy)methylsilane; alkyldialkoxyamidosilanes; alkylalkoxybisamidosilanes; methylethoxybis(N-methylbenzamido)silane; methylethoxydibenzamidosilane; methyldimethoxy(ethylmethylketoximo)silane; bis(ethylmethylketoximo)methylmethoxysilane; (acetaldoximo)methyldimethoxysilane; (N-methylcarbamato)methyldimethoxysilane; (N-methylcarbamato) ethyldimethoxy silane; (isopropenoxy)methyldimethoxysilane; (isopropenoxy)trimethoxysilane; tris(isopropenoxy)methylsilane; (but-2-en-2-oxy) methyldimethoxysilane; (1-phenylethenoxy) methyldimethoxysilane; 2-((1-carboethoxy)propenoxy) methyldimethoxysilane; bis(N-methylamino)methylmethoxysilane; (N-methylamino)vinyldimethoxysilane; tetrakis(N,N-diethylamino)silane; methyldimethoxy(N-methylamino)silane; methyltris(cyclohexylamino)silane; methyldimethoxy(N-ethylamino)silane; dimethylbis(N,N-dimethylamino)silane; methyldimethoxy(N-isopropylamino)silane dimethylbis(N,N-diethylamino)silane; ethyldimethoxy(N-ethylpropionamido)silane; methyldimethoxy (N-methylacetamido)silane; methyltris(N-methylacetamido)silane; ethyldimethoxy(N-methylacetamido)silane; methyltris(N-methylbenzamido) silane; methylmethoxybis(N-methylacetamido)silane; methyldimethoxy(ε-caprolactamo)silane; trimethoxy(N-methylacetamido)silane; methyldimethoxy(O-ethylacetimidato)silane; methyldimethoxy(O-propylacetimidato)silane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxy(isocyanato)silane; dimethoxydiisocyanatosilane; methyldimethoxy-isothiocyanatosilane; methylmethoxydiisothiocyanatosilane; methyltriacetoxysilane; methylmethoxydiacetoxysilane; methylethoxydiacetoxysilane; methylisopropoxydiacetoxysilane; methyl(n-propoxy)diacetoxysilane; methyldimethoxyacetoxysilane; methyldiethoxyacetoxysilane; methyldiisopropoxyacetoxysilane; methyldi(n-propoxy)acetoxysilane; or the condensates thereof; or a combination of two or more thereof.

In one non-limiting embodiment, there is provided herein a curable composition comprising at least one polysiloxane of the general formula (I) as described herein, and a polysiloxane of the general formula (II) as described herein, wherein each of $R^1$, $R^2$, $R^3$, $R^4$, x, y, and m in formula (II) is as defined in formula (I) herein, and both M groups in formula (I) are alkenyl groups of from 2 to about 12 carbon atoms. Such as the non-limiting example of where both M groups in formula (I) are an alkenyl of from 2 to about 12 carbon atoms. It is embodied herein that the M groups in formula (I), when alkenyl, can be the same or different alkenyl group of from 2 to about 12 carbon atoms. Such curable compositions as described herein can further comprise at least one of a catalyst, adhesion promoter, filler, cure promoter and solvent as described herein. In one non-limiting embodiment formula (I) can be as described herein wherein each M is a hydroxy group and wherein the adhesion promoter is as described herein.

In one more specific embodiment, the curable composition comprising at least one polysiloxane of the general formula (I) can further comprise a cure catalyst and/or initator. In one embodiment, the cure catalyst is selected from the group consisting of metal, metal chelate, an amine, an acid, a base, and combinations thereof.

In yet one more specific embodiment, the curable composition comprising at least one polysiloxane of the general formula (I) can further comprise an optional component selected from the group consisting of an adhesion promoter; filler and, mixtures thereof. Some non-limiting examples of adhesion promoter can be such that comprise an amino group containing silane or a mixture of different amino group containing silanes. The amino group-containing silane adhesion promoter agent is a compound having a group containing a silicon atom bonded to a hydrolyzable group (hereinafter referred to as a hydrolyzable group attached to the silicon atom) and an amino group. Specific examples thereof include the same silyl groups with hydrolyzable groups described above. Among these groups, the methoxy group and ethoxy group are particularly suitable. The number of the hydrolyzable groups may be 2 or more, and particularly suitable are compounds having 3 or more hydrolyzable groups.

Some non-limiting examples of suitable adhesion promoters include, N-(2-aminoethyl)aminopropyltrimethoxysilane gamma-aminopropyltriethoxysilane, gamma-aminopropyltrimethoxysilane, bis(gamma-trimethoxysilypropyl)amine, N-phenyl-gamma-aminopropyltrimethoxysilane, triaminofunctionaltrimethoxysilane, gamma-aminopropylmethyldimethoxysilane, gamma-aminopropylmethyldiethoxysilane, methacryloxypropyltrimethoxysilane, methylaminopropyltrimethoxysilane, gamma-glycidoxypropyethyldimethoxysilane, gamma-glycidoxypropyltrimethoxysilane, gamma-glycidoxyethyltrimethoxysilane, gamma-(3,4-epoxycyclohexyl)ethyltrimethoxysilane, beta-(3,4-epoxycyclohexyl)ethylmethyl-dimethoxysilane, epoxylimonyltrimethoxysilane, isocyanatopropyltriethoxysilane, isocyanatopropyltrimethoxysilane, isocyanatopropylmethyldimethoxysilane, beta-cyano-ethyl-trimethoxysilane, gamma-acryloxypropyl-trimethoxy-silane, gamma-methacryloxypropyl-methyldimethoxysilane, alpha, omega-bis-(aminoalkyl-diethoxysilyl)-polydimethylsiloxanes (Pn=1-7), alpha, omega-bis-(aminoalkyl-diethoxysilyl)-octamethyltetrasiloxane, 4-amino-3,3,-dimethyl-butyl-trimethoxysilane, and N-ethyl-3-tri-methoxy-silyl-2-methylpropanamine, 3-(diethyl-aminopropyl)-trimethoxysilane combinations of two or more thereof, and the like. Particularly suitable adhesion promoters include bis(alkyltrialkoxysilyl)amines and tris(alkyltrialkoxysilyl) amines including, but not limited to, bis(3-propyltrimethoxysilyl)amine and tris(3-propyltrimethoxysilyl)amine.

Some more specific non-limiting examples of adhesion promoters can include those selected from the group consisting of aminoalkyltrialkoxysilane, aminoalkylalkyldialkoxysilane, bis(alkyl-trialkoxysilyl)amine, tris(alktrialkoxysilyl)amine, tris(alkyltrailkoxysilyl)-cyanurate, tris (alkyltrialkoxysilyl)isocyanurate, and combinations thereof.

The filler can be reinforcing or non-reinforcing fillers or combinations thereof. In one embodiment the filler is selected from the group consisting of fumed silica, precipitated silica, clay, carbon black, calcium carbonates and combinations thereof.

In another more specific embodiment, the curable composition comprising at least one polysiloxane of the general formula (I) can further comprise an optional component selected from the group consisting of UV stabilizer, antioxidant, cure accelerator, thixotropic agent, plasticizer, moisture scavenger, pigment, dye, surfactant, solvent and combinations thereof.

In one other embodiment herein, there is provided a curable composition comprising (a) a polysiloxane of the general formula (I), where each M is independently selected from an alkenyl group, an alkynyl group, an amino group, an alkoxy group, an alkoxyalkyl, an oximoalkyl, an enoxyalkyl, an aminoalkyl, a carboxyalkyl, an amidoalkyl, an amidoaryl, a carbamatoalkyl, an epoxy group, an anhydride group, a carboxyl group, a carbonyl group, an acyl group, an amide group, an ionic group, an amide group, an azo group, an imine group, an isocyanate, nitrile, nitrate, nitro, nitroso group, an acryl group, an acrylol group or a thiol group, x is from 1 to 250, y is from 0 to 100, n' is greater than 1 and m is from to 1 to 5, (b) an initiator for photo-curing and optionally, (c) a further reactive component selected from the group consisting of a photo curable reactive component, a crosslinker of silane type, a filler, adhesion promoter, solvent, cure promoter, a cure retardant and combinations thereof.

In one embodiment herein any one of the polysiloxane of the general formula (I), the copolymer thereof as described herein, the composition of copolymer and further polymer or the curable composition(s) as described herein can be used to form an article. The article can be any article that would be benefited by the improved physical and/or chemical properties described herein. Some technologies that would benefit such an article include automotive, electronic and medical technologies. In one embodiment the article can be made by molding, shaping, or forming the any one of the polysiloxane of the general formula (I), the copolymer thereof as described herein, or the composition of copolymer and further polymer described herein to obtain the article.

In one embodiment herein there is also provided a cured composition made by the process of curing any of the curable compositions described herein. Such curing can be provided by any suitable method described herein, such as for example, by addition curing, condensation curing and/or ultraviolet light curing. The cured composition can be any one of a solid, a fluid, a liquid or a gum. Such cured compositions can be used in any one of an elastomer, a sealant, an adhesive, a coating and a combination thereof.

In one embodiment, the comparative tracking index is measured using ASTM D5288-14, Standard Test Method for Determining Tracking Index of Electrical Materials Using Various Electrode Materials. In another embodiment, the haze is determined in accordance with ASTM D1003-13, Standard Test Method for Haze and Luminous Transmittance. In still another embodiment, the physical properties of composition containing the reactive polysiloxane of the present invention are determined in accordance with ASTM D638-14, Standard Test Method for Tensile Properties of Plastics.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

EXAMPLES

Example 1

Synthesis of Hydride End-Capped Hybrid Siloxane Polymer

A 1 L three neck round bottom flask fitted with a reflux condenser, dropping funnel and a mechanical stirrer under nitrogen environment was charged 50 mL of toluene and 1,7-octadiene (13.35 grams, 0.121 mol). To this solution 0.29 gram of Karstedt's catalyst (15 ppm of 2 wt % Pt) was added. The whole set-up was kept in an oil bath with reaction temperature maintained at 70° C. Hydride end-capped siloxane ($^H MD_{35}M^H$, 350 grams, 0.128 mol, wherein the silicone units of $M^H$ and D contain methyl groups other than the one required H group in each $M^H$) in a dropping funnel was added drop wise over a period of 1 hour. The reaction temperature was subsequently increased to 80° C. and continue the reaction until all the 1,7-octadiene gets consumed. After completion of the hydrosilylation polymerization, unreacted starting materials, volatile compounds and the solvent were stripped under reduced pressure. The final product was obtained as a yellow color liquid in quantitative yield and was decolorized with activated charcoal to yield the desired product as a colorless liquid in quantitative yield. The chemical structure and composition of the copolymers are inferred through spectral and chromatographic.

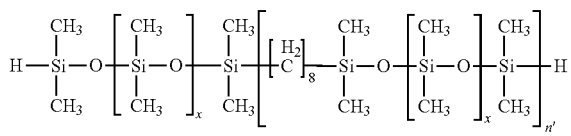

wherein x is 35 and n' is 7.75

Example 2

Synthesis of Vinyl End-Capped Hybrid Siloxane Polymer

A 500 mL three neck round bottom flask fitted with a reflux condenser, dropping funnel and a mechanical stirrer under nitrogen environment was charged 25 mL of toluene and 1,7-octadiene (7.5 grams, 0.067 mol). To this solution 0.14 gram of Karstedt's catalyst (15 ppm of 2 wt % Pt) was added. The whole set-up was kept in an oil bath with reaction temperature maintained at 70° C. Hydride end-capped siloxane ($^H MD_{35}M^H$, 175 grams, 0.064 mol, wherein the silicone units of $M^H$ and D contain methyl groups other than the one required H group in each $M^H$) in a dropping funnel was added drop wise over a period of 1 hour. The reaction temperature was subsequently increased to 80° C. and the reaction was continued until all the hydride gets consumed. After completion of the hydrosilylation polymerization, unreacted starting materials, volatile compounds and the solvent were stripped under reduced pressure. The final product was obtained as a yellow color liquid in quantitative yield and was decolorized with activated charcoal to yield the desired product as a colorless liquid in quantitative yield. The chemical structure and composition of the copolymers are inferred through spectral and chromatographic.

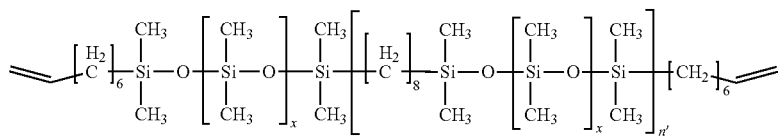

wherein x is 23.6 and n' is 8.

Example 3

Synthesis of Methoxysilane End-Capped Hybrid Siloxane Polymer

A 500 mL three neck round bottom flask fitted with a reflux condenser, dropping funnel and a mechanical stirrer under nitrogen environment was charged 50 mL of toluene and 1,7-octadiene (6.65 grams, 0.061 mol). To this solution 0.14 gram of Karstedt's catalyst (15 ppm of 2 wt % Pt) was added. The whole set-up was kept in an oil bath with reaction temperature maintained at 70° C. Hydride end-capped siloxane ($^H MD_{35}M^H$, 175 grams, 0.064 mol, wherein the silicone units of $M^H$ and D contain methyl groups other than the one required H group in each $M^H$) in a dropping funnel was added drop wise over a period of 1 hour. The reaction temperature was subsequently increased to 80° C. Once all 1,7-octadiene was consumed, vinyl trimethoxysilane (0.5 gram, 0.003 mol) in 25 mL of isopropylalcohol was added and reaction was continued until all hydride is consumed. After completion of the hydrosilylation polymerization, unreacted starting materials, volatile compounds and the solvent were stripped under reduced pressure. The final product was obtained as a yellow color liquid in quantitative yield and was decolorized with activated charcoal to yield the desired product as a colorless liquid in quantitative yield. The chemical structure and composition of the copolymers are inferred through spectral analysis.

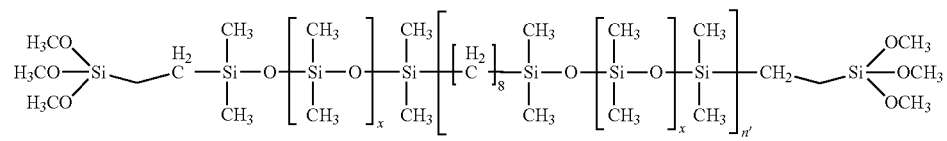

wherein x is 18.1 and n' is 5.75.

Example 4

Synthesis of Methacrylate End-Capped Hybrid Siloxane Polymer

A 500 mL three neck round bottom flask fitted with a reflux condenser, dropping funnel and a mechanical stirrer under nitrogen environment was charged 50 mL of toluene and 1,7-octadiene (6.65 grams, 0.061 mol). To this solution 0.14 gram of Karstedt's catalyst (15 ppm of 2 wt % Pt) was added. The whole set-up was kept in an oil bath with reaction temperature maintained at 70° C. Hydride end-capped siloxane ($^{H}MD_{35}M^{H}$, 175 grams, 0.064 mol, wherein the silicone units of $M^H$ and D contain methyl groups other than the one required H group in each $M^H$) in a dropping funnel was added drop wise over a period of 1 hour. The reaction temperature was subsequently increased to 80° C. Once all 1,7-octadiene was consumed, allyl methacrylate (0.5 gram, 0.003 mol) in 5 mL of toluene was added and reaction was continued until all hydride is consumed. After completion of the hydrosilylation polymerization, unreacted starting materials, volatile compounds and the solvent were stripped under reduced pressure. The final product was obtained as a yellow color liquid in quantitative yield and was decolorized with activated charcoal to yield the desired product as a colorless liquid in quantitative yield. The chemical structure and composition of the copolymers are inferred through spectral analysis.

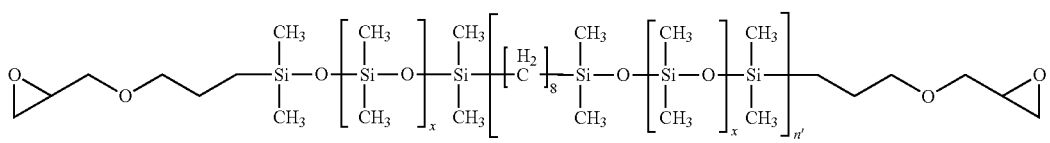

wherein x is 11.2 and n' is 2.2.

Example 5

Synthesis of Epoxy End-Capped Hybrid Siloxane Polymer

A 500 mL three neck round bottom flask fitted with a reflux condenser, dropping funnel and a mechanical stirrer under nitrogen environment was charged 50 mL of toluene and 1,7-octadiene (6.65 grams, 0.061 mol). To this solution 0.14 gram of Karstedt's catalyst (15 ppm of 2 wt % Pt) was added. The whole set-up was kept in an oil bath with reaction temperature maintained at 70° C. Hydride end-capped siloxane ($^{H}MD_{35}M^{H}$, 175 grams, 0.064 mol, wherein the silicone units of $M^H$ and D contain methyl groups other than the one required H group in each $M^H$) in a dropping funnel was added drop wise over a period of 1 hour. The reaction temperature was subsequently increased to 80° C. Once all 1,7-octadiene was consumed, allyl glycidyl ether (0.4 gram, 0.003 mol) in 5 mL of toluene was added and reaction was continued until all hydride is consumed. After completion of the hydrosilylation polymerization, unreacted starting materials, volatile compounds and the solvent were stripped under reduced pressure. The final product was obtained as a yellow color liquid in quantitative yield and was decolorized with activated charcoal to yield the desired product as a colorless liquid in quantitative yield. The chemical structure and composition of the copolymers are inferred through spectral analysis.

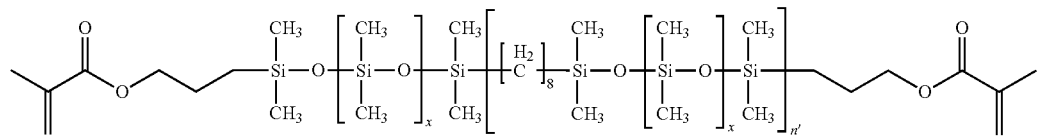

wherein x is 14 and n' is 3.65.

Example 6

Synthesis of Anhydride End-Capped Hybrid Siloxane Polymer

A 500 mL three neck round bottom flask fitted with a reflux condenser, dropping funnel and a mechanical stirrer under nitrogen environment was charged 50 mL of toluene and 1,7-octadiene (6.65 grams, 0.061 mol). To this solution 0.14 gram of Karstedt's catalyst (15 ppm of 2 wt % Pt) was added. The whole set-up was kept in an oil bath with reaction temperature maintained at 70° C. Hydride end-capped siloxane ($^{H}MD_{35}M^{H}$, 175 grams, 0.064 mol, wherein the silicone units of $M^H$ and D contain methyl groups other than the one required H group in each $M^H$) in a dropping funnel was added drop wise over a period of 1 hour. The reaction temperature was subsequently increased to 80° C. Once all 1,7-octadiene was consumed, 5-nor-bornene-endo-2,3-dicarboxylic anhydride (0.55 gram, 0.003 mol) in 5 mL of toluene was added and reaction was continued until all hydride is consumed. After completion of the hydrosilylation polymerization, unreacted starting materials, volatile compounds and the solvent were stripped under reduced pressure. The final product was obtained as a yellow color liquid in quantitative yield and was decolorized with activated charcoal to yield the desired product as a colorless liquid in quantitative yield. The chemical structure and composition of the copolymers are inferred through spectral analysis.

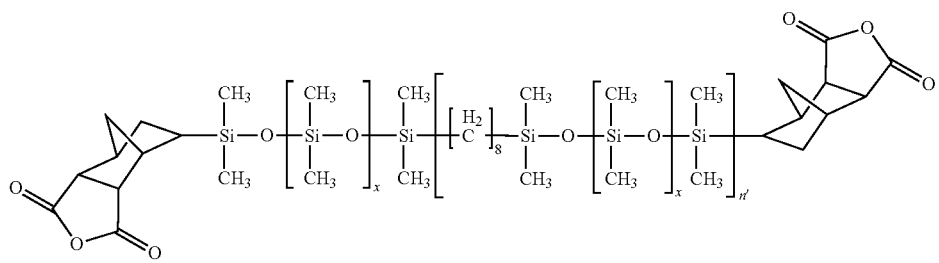

wherein x is 17.5 and n'=4.5

Examples 7-17 and Comparative Example 1

Cure Formulations

The synthesized vinyl end-capped hybrid siloxane polymer of example 2 and the synthesized hydride end capped hybrid siloxane polymer of example 1 was independently mixed in different proportions with component A and component B of commercially available elastomer formulation of Liquid silicone rubber (LSR 2050, Momentive) respectively in a blender and were cured by compression molding at 180° C. for 10 min under pressure to get an elastomeric sheet. The respective sheets were analyzed for % transmittance, haze, yellowness index (YI) and % elongation (Table 1).

-continued

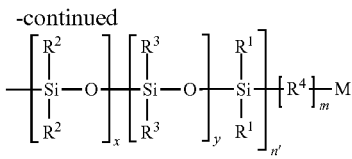

wherein
each occurrence of $R^1$, $R^2$ and $R^3$ is independently a linear or branched aliphatic group containing up to about 20 carbon atoms, an unsubstituted or substituted aryl group containing from about 6 to about 18 carbon atoms, optionally containing at least one heteroatom, and an alicyclic group containing up to about 20 carbon atoms;
each occurrence of $R^4$ is independently a divalent alkyl group of from about 1 to about 6 carbon atoms, a divalent unsubstituted or substituted aryl group con-

TABLE 1

|  | Comparative Example 1 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| LSR2050 Component A | 100 | 80 | 60 | 80 | 60 | 100 | 100 | 80 | 80 | 60 | 60 | 60 |
| vinyl substituted polysiloxane Example 2 |  | 20 | 40 |  |  |  |  | 20 | 20 | 40 | 40 | 40 |
|  |  |  |  | 20 | 40 |  |  |  |  |  |  |  |
| LSR2050 Component B | 100 | 100 | 100 | 100 | 100 | 95 | 90 | 95 | 90 | 95 | 90 | 80 |
| Example 1 |  |  |  |  |  | 5 | 10 | 5 | 10 | 5 | 10 | 20 |
| Total | 200 | 200 | 200 | 200 | 200 | 200 | 200 | 200 | 200 | 200 | 200 | 200 |
| % Transmitance | 90.6 | 90 | 90.5 | 89.9 | 89.7 | 90.1 | 90.3 | 90.1 | 90.1 | 89.4 | 89.3 | 88.9 |
| Haze | 33 | 8 | 5.6 | 5.02 | 33.4 | 38.7 | 15.4 | 15.7 | 17.7 | 33.1 | 8.51 | 37.7 |
| YI | 3.58 | 4.89 | 5.45 | 5.86 | 5.12 | 3.58 | 4.66 | 5.37 | 5.48 | 5.38 | 6.72 | 5.2 |
| % elongation | 456 | 489 | 459 | 490 | 481 | 523 | 544 | 492 | 464 | 434 | 414 | 404 |

LSR 2050 - Liquid silicone rubber, Momentive Inc.

The invention claimed is:

1. A curable composition comprising
at least one polysiloxane having the general structural formula (I):

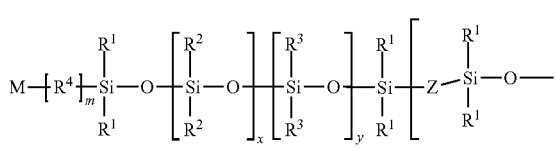

(I)

taining up to about 18 carbon atoms, a divalent unsubstituted or substituted alicyclic group containing up to about 18 carbon atoms, a divalent unsubstituted or substituted acyl group containing up to about 18 carbon atoms, a divalent ester group containing up to about 8 carbon atoms, or a divalent ether group containing up to about 8 carbon atoms;
each occurrence of Z is independently selected from a divalent linear, branched or cyclic alkyl group containing from about 2 to about 25 carbon atoms, a divalent linear, branched or cyclic alkenyl group containing from about 2 to about 25 carbon atoms, and a divalent unsubstituted or substituted aryl group of up to about 20 carbon atoms;

each occurrence of M is independently a hydroxy group, an alkynyl group of from about 2 to about 12 carbon atoms, an amino group, an alkoxy group containing from about 1 to about 8 carbon atoms, an alkoxyalkyl group containing from about 2 to about 10 carbon atoms, an oximoalkyl group containing up to about 8 carbon atoms, an enoxyalkyl group containing up to about 8 carbon atoms, an aminoalkyl group containing up to about 8 carbon atoms, a carboxyalkyl group containing up to about 8 carbon atoms, an amidoaliphatic group containing up to about 8 carbon atoms, an amidoaryl group containing up to about 12 carbon atoms, a carbamato alkyl group containing up to about 8 carbon atoms, an anhydride group, a carboxyl group containing up to about 8 carbon atoms, a carbonyl group, an acyl group containing up to about 8 carbon atoms, an amide group, an ionic group, an imine group containing up to about 8 carbon atoms, an isocyanate group, a nitrile group, an (meth)acryl group, an (meth)acrylol group, an alkoxysilyl group, an alkoxyalkylsilyl group, an acyloxysilyl group, a hydroxyalkylsilyl group or a thiol group;

the subscript x is an integer of from 1 to 250, the subscript y is an integer from 0 to 100, the subscript n' is an integer from 2 to 10,000, and the subscript m is an integer of from to 1 to 5; and at least one component selected from the group consisting of:

a second polysiloxane of the general formula (II):

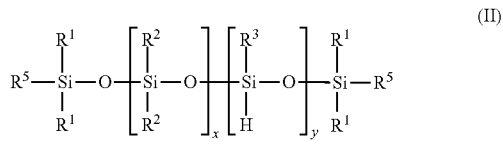

wherein
each of $R^1$, $R^2$ and $R^3$ is independently a linear or branched aliphatic group containing up to about 20 carbon atoms, an unsubstituted or substituted aryl group containing from about 6 to about 18 carbon atoms, optionally containing at least one heteroatom, and an alicyclic group containing up to about 20 carbon atoms;

each $R^4$ is independently a divalent alkyl group of from about 1 to about 6 carbon atoms, an unsubstituted or substituted aryl group containing up to about 18 carbon atoms, an unsubstituted or substituted alicyclic group containing up to about 18 carbon atoms, an unsubstituted or substituted acyl group containing up to about 18 carbon atoms, an ester group containing up to about 8 carbon atoms, an ether group containing up to about 8 carbon atoms, or an acyl group containing up to about 8 carbon atoms;

$R^5$ is a hydrogen, alkyl group of from 1 to 4 carbon atoms or phenyl, the subscript x is an integer of from 1 to 250;

and the subscript y is an integer from 0 to 100, with the proviso that when y is 0 or 1, $R^5$ is hydrogen, a crosslinker, and a chain extender.

2. The curable composition of claim 1 wherein the crosslinker is at least one silane crosslinker, at least one siloxane cross linker, or a combination thereof.

3. The curable composition of claim 1 wherein the chain extender is at least one silane chain extender, at least one siloxane chain extender, or a combination thereof.

4. The curable composition of claim 1 further comprising at least one other component selected from the group consisting of a cure catalyst, a photo-curing initiator, a photo-curable reactive component, a photo-cure promoter, a cure retardant, an adhesion promoter, a filler, a UV stabilizer, an antioxidant, a cure accelerator, a thixotropic agent, a plasticizer, a moisture scavenger, a pigment, a dye, a surfactant and a solvent.

5. The curable composition of claim 4 wherein the cure catalyst is at least one cure catalyst selected from the group consisting of a metal, a metal chelate, an amine, an acid and a base.

6. The curable composition of claim 4 wherein the adhesion promoter is at least one an amino group containing silane or a mixture of different amino groups containing silanes.

7. The curable composition of claim 4 wherein the adhesion promoter is at least one adhesion promoter selected from the group consisting of aminoalkyltrialkoxysilane, aminoalkylalkyldialkoxysilane, bis(alkyl-trialkoxysilyl)amine, tris(alktrialkoxysilyl)amine, tris(alkyltrailkoxysilyl)cyanurate and tris(alkyltrialkoxysilyl)isocyanurate.

8. The curable composition of claim 4 wherein the filler is a reinforcing filler, a non-reinforcing fillers or combinations thereof.

9. The curable composition of claim 4 wherein the filler is at least one filler selected from the group consisting of fumed silica, precipitated silica, clay, carbon black and calcium carbonate.

10. The curable composition of claim 1 wherein in formula (I) each M is a hydroxy group, an alkoxysilyl group, an alkoxyalkylsilyl group, an acyloxysilyl group or a hydroxyalkylsilyl group and wherein the crosslinker is at least one selected from the group consisting of an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane and an alkoxycarbamatosiloxane.

11. The curable composition of claim 10 further comprising at least one component selected from the group consisting of a catalyst, an adhesion promoter, a filler, a cure promoter and a solvent.

12. A curable composition comprising:
(a) a polysiloxane of the general formula (I):

$$M \left[ R^4 \right]_m \begin{bmatrix} R^1 \\ | \\ Si-O \\ | \\ R^1 \end{bmatrix} \begin{bmatrix} R^2 \\ | \\ Si-O \\ | \\ R^2 \end{bmatrix}_x \begin{bmatrix} R^3 \\ | \\ Si-O \\ | \\ R^3 \end{bmatrix}_y \begin{bmatrix} R^1 \\ | \\ Si \\ | \\ R^1 \end{bmatrix} Z \begin{bmatrix} R^1 \\ | \\ Si-O \\ | \\ R^1 \end{bmatrix} \begin{bmatrix} R^2 \\ | \\ Si-O \\ | \\ R^2 \end{bmatrix}_x \begin{bmatrix} R^3 \\ | \\ Si-O \\ | \\ R^3 \end{bmatrix}_y \begin{bmatrix} R^1 \\ | \\ Si \\ | \\ R^1 \end{bmatrix} \left[ R^4 \right]_m M \quad (I)$$

and
(b) a polysiloxane of the general formula (II):

$$R^5 - \begin{matrix} R^1 \\ | \\ Si-O \\ | \\ R^1 \end{matrix} \begin{bmatrix} R^2 \\ | \\ Si-O \\ | \\ R^2 \end{bmatrix}_x \begin{bmatrix} R^3 \\ | \\ Si-O \\ | \\ H \end{bmatrix}_y \begin{matrix} R^1 \\ | \\ Si-R^5 \\ | \\ R^1 \end{matrix} \quad (II)$$

wherein
  each of $R^1$, $R^2$ and $R^3$ are independently a linear or branched aliphatic group containing up to about 20 carbon atoms, an unsubstituted or substituted aryl group containing from about 6 to about 18 carbon atoms, optionally containing at least one heteroatom, and an alicyclic group containing up to about 20 carbon atoms;
  each $R^4$ is independently, a divalent alkyl group of from about 1 to about 6 carbon atoms, an unsubstituted or substituted aryl group containing up to about 18 carbon atoms, an ester group containing up to about 8 carbon atoms, an ether group containing up to about 8 carbon atoms, or an acyl group containing up to about 8 carbon atoms;
  $R^5$ is a hydrogen, alkyl group of from 1 to 4 carbon atoms or phenyl;
  each Z is independently chosen from a divalent linear, branched or cyclic alkyl group containing from about 2 to 25 carbon atoms, a divalent linear, branched or cyclic alkenyl group containing from about 2 to about 25 carbon atoms, and a divalent unsubstituted or substituted aryl group of up to about 20 carbon atoms;
  both M groups in formula (I) are alkenyl groups of from about 2 to about 12 carbon atoms; and
  the subscript x is an integer of from 1 to 250, the subscript y is an integer from 0 to 100, the subscript n' is an integer greater than or equal to 2, and the subscript m is an integer of from to 1 to 5;
  with the proviso that when y is 0 or 1, $R^5$ is hydrogen.

13. The curable composition of claim 12 further comprising at least one component selected from the group consisting of a catalyst, an adhesion promoter, a filler, a cure promoter and a solvent.

14. A curable composition comprising:
(a) at least one polysiloxane of the general formula (I)

$$M \left[ R^4 \right]_m \begin{bmatrix} R^1 \\ | \\ Si-O \\ | \\ R^1 \end{bmatrix} \begin{bmatrix} R^2 \\ | \\ Si-O \\ | \\ R^2 \end{bmatrix}_x \begin{bmatrix} R^3 \\ | \\ Si-O \\ | \\ R^3 \end{bmatrix}_y \begin{bmatrix} R^1 \\ | \\ Si \\ | \\ R^1 \end{bmatrix} Z \begin{bmatrix} R^1 \\ | \\ Si-O \\ | \\ R^1 \end{bmatrix} \begin{bmatrix} R^2 \\ | \\ Si-O \\ | \\ R^2 \end{bmatrix}_x \begin{bmatrix} R^3 \\ | \\ Si-O \\ | \\ R^3 \end{bmatrix}_y \begin{bmatrix} R^1 \\ | \\ Si \\ | \\ R^1 \end{bmatrix} \left[ R^4 \right]_m M,$$

wherein
  each of $R^1$, $R^2$ and $R^3$ are independently a linear or branched aliphatic group containing up to about 20 carbon atoms, an unsubstituted or substituted aryl group containing from about 6 to about 18 carbon atoms, optionally containing at least one heteroatom, and an alicyclic group containing up to about 20 carbon atoms;
  each $R^4$ is independently, a divalent alkyl group of from about 1 to about 6 carbon atoms, an unsubstituted or substituted aryl group containing up to about 18 carbon atoms, an ester group containing up to about 8 carbon atoms, an ether group containing up to about 8 carbon atoms, or an acyl group containing up to about 8 carbon atoms;
  each Z is independently chosen from a divalent linear, branched or cyclic alkyl group containing from about 2 to about 25 carbon atoms, a divalent linear, branched or cyclic alkenyl group containing from about 2 to about 25 carbon atoms, and a divalent unsubstituted or substituted aryl group of up to about 20 carbon atoms;
  each M is independently chosen from an alkenyl group, an alkynyl group, an amino group, an alkoxy group, an alkoxyalkyl, an oximoalkyl, an enoxyalkyl, an aminoalkyl, a carboxyalkyl, an amidoalkyl, an amidoaryl, a carbamatoalkyl, an epoxy group, an anhydride group, a carboxyl group, a carbonyl group, an acyl group, an amide group, an ionic group, an amide group, an azo group, an imine group, an isocyanate, nitrile, nitrate, nitro, nitroso group, an acryl group, an acrylol group, an alkoxysilyl group, an alkoxyalkylsilyl group, an acyloxysilyl group, a hydroxyalkylsilyl group or a thiol group;
  x is an integer from 1 to 250, y is an integer from 0 to 100, n' is an integer greater than 1 and m is an integer from to 1 to 5,
(b) at least one photo-curing initiator and optionally,
(c) at least one further component selected from the group consisting of a photo curable reactive component, a silane crosslinker, a filler, an adhesion promoter, a solvent, a photo-cure promoter and a cure retardant.

15. An elastomer, a sealant, an adhesive, a coating or a combination thereof comprising the curable composition of claim 1, wherein the curable composition is cured.

16. An elastomer, a sealant, an adhesive, a coating or a combination thereof comprising the curable composition of claim 12 wherein the curable composition is cured.

17. An elastomer, a sealant, an adhesive, a coating or a combination thereof comprising the curable composition of claim 14 wherein the curable composition is cured.

18. The curable composition of claim 1 wherein the crosslinker is at least one selected from the group consisting of an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane and an alkoxycarbamatosiloxane.

19. The curable composition of claim 1 wherein the chain extender is at least one selected from the group consisting of an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane and an alkoxycarbamatosiloxane.

20. The curable composition of claim 1 wherein in formula (I) each M is a hydroxy group, an alkoxysilyl group, an alkoxyalkylsilyl group, an acyloxysilyl group or a hydroxyalkylsilyl group and wherein the chain extender is at least one selected from the group consisting of an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane and an alkoxycarbamatosiloxane.

21. The curable composition of claim 20 further comprising at least one component selected from the group consisting of a catalyst, an adhesion promoter, a filler, a cure promoter and a solvent.

* * * * *